(12) United States Patent
Engel et al.

(10) Patent No.: US 7,496,671 B2
(45) Date of Patent: Feb. 24, 2009

(54) SELF-CONFIGURING COMMUNICATIONS MODULE ADAPTIVE TO DIFFERENT HOST SYSTEM TYPES

(75) Inventors: Andy Engel, Portola Valley, CA (US); Janet L. Yun, Santa Clara, CA (US)

(73) Assignee: Avago Technologies Fiber IP (Singapore) Pte. Ltd. (SG)

( * ) Notice: Subject to any disclaimer, the term of this patent is extended or adjusted under 35 U.S.C. 154(b) by 942 days.

(21) Appl. No.: 10/679,562

(22) Filed: Oct. 6, 2003

(65) Prior Publication Data

US 2005/0097212 A1 May 5, 2005

(51) Int. Cl.
*G06F 15/16* (2006.01)

(52) U.S. Cl. .................. 709/230; 709/220; 709/228; 709/237

(58) Field of Classification Search .............. 709/228, 709/237, 220, 230
See application file for complete search history.

(56) References Cited

U.S. PATENT DOCUMENTS

| | | | | |
|---|---|---|---|---|
| 4,807,282 | A |   | 2/1989 | Kazan et al. |
| 5,247,517 | A | * | 9/1993 | Ross et al. ................ 370/452 |
| 5,305,317 | A |   | 4/1994 | Szczepanek |
| 5,557,748 | A | * | 9/1996 | Norris ...................... 709/220 |
| 5,754,552 | A |   | 5/1998 | Allmond et al. |
| 5,757,680 | A | * | 5/1998 | Boston et al. ................ 379/21 |
| 5,790,786 | A |   | 8/1998 | Wakeman et al. |
| 5,918,016 | A | * | 6/1999 | Brewer et al. ............... 709/220 |
| 6,038,400 | A |   | 3/2000 | Bell et al. |
| 6,067,585 | A |   | 5/2000 | Hoang |
| 6,072,803 | A |   | 6/2000 | Allmond et al. |
| 6,349,331 | B1 | * | 2/2002 | Andra et al. ................ 709/220 |
| 6,393,489 | B1 |   | 5/2002 | Sambamurthy et al. |
| 6,529,961 | B1 |   | 3/2003 | Bray |
| 6,556,589 | B2 |   | 4/2003 | McRobert et al. |
| 7,127,506 | B1 | * | 10/2006 | Schmidt et al. ............. 709/224 |
| 2003/0067884 | A1 |   | 4/2003 | Abler et al. |

FOREIGN PATENT DOCUMENTS

| DE | 3688972 T2 | 4/1994 |
|---|---|---|
| DE | 19935001 A1 | 2/2001 |
| DE | 10164475 A1 | 7/2003 |

OTHER PUBLICATIONS

IEEE Standards for Local and Metropolitan Area Networks: Suuplement to Carrier Sense Multiple Access with Collision Detection (CSMA/CD) Access Method and Physical Layer Specifications, Jun. 14, 1995, 2nd Printing Corrected Edition.*
IEEE Std 802.3-2002, Section Two, Chapter 28, pp. 213-260 (2002).
"Internetworking Technologies Handbook," Cisco Systems Inc., Chapter 7, pp. 7-1-7-38 (Aug. 2003).

* cited by examiner

*Primary Examiner*—Phuoc H Nguyen

(57) ABSTRACT

A communications module that includes a host interface port, a network medium interface port, and a protocol handler is described. The host interface port is connectable to a media access control interface of a host system. The network medium interface port is connectable to a network medium. The protocol handler is operable to identify a communications protocol compatible with the host system and to adaptively self-configure communications between the host interface port and the network medium interface port in accordance with the identified compatible communications protocol. A method of self-configuring a communications module also is described.

20 Claims, 3 Drawing Sheets

SELF-CONFIGURING COMMUNICATIONS MODULE ADAPTIVE TO DIFFERENT HOST SYSTEM TYPES

CROSS-REFERENCE TO RELATED APPLICATIONS

This application relates to U.S. patent application Ser. No. 10/205,773, filed Jul. 26, 2002, by Andy Engel et al. and entitled "Multiple Protocol Handshaking Between Systems," which is incorporated herein by reference.

TECHNICAL FIELD

This invention relates to network communications modules.

BACKGROUND

Networks connect many different kinds of electronic devices. Communication protocols and standards have been developed to standardize the exchange of data between electronic devices in a network. Among the most common types of network protocols are Ethernet, Token Ring, Fiber Optic Inter-Repeater Link (FOIRL), Copper Distributed Data Interface (CDDI), and Fiber Distributed Data Interface (FDDI). Ethernet, Token Ring and FDDI communications protocols commonly are used to move packets over local area networks (LANs). Higher layer protocols, such as TCP/IP, SPX/IPX and NetBIOS/NetBEUI, typically are used to control and route data transmissions. Other exemplary communications protocols include ATM and SS7. In general, a communications protocol is any format, definition, or specification that specifies the content or nature of data transmitted in a network or the link over which the data is transmitted. A protocol typically includes transmission rate specifications, wired or wireless link specifications, frame formats, blocking formats, text formats, stop/start indicators, framing and heading indicators, field definitions, checksum values, and carriage return and line feed (CRJLF) indicators.

Data may be transferred through a network using a variety of transmission cable technologies, including multimode optical fiber cables, single mode optical fiber cables, and copper cables (e.g., twinax and coax copper cables). Standard communications modules have been developed to transition between respective transmission cable media and the electronic components inside a host system (e.g., a computer or peripheral device). For example, an optoelectronics transceiver module enables bidirectional data transmission between an electrical interface and an optical data link. A copper transceiver module, on the other hand, enables bidirectional data transmission between two electrical devices. A communications module produces a standardized output to the host system in accordance with a compatible communications protocol, regardless of the medium (e.g., optical fiber or copper) through which the data is transmitted or received. A communications module may be integrally incorporated within a host system or a host system component (e.g., a network interface card (NIC)) or it may consist of a separate component that readily may be plugged into and unplugged from a host system. Among the common communication modules are transmitter modules, receiver modules, and transceiver modules.

SUMMARY

In one aspect, the invention features a communications module that includes a host interface port, a network medium interface port, and a protocol handler. The host interface port is connectable to a media access control interface of a host system. The network medium interface port is connectable to a network medium. The protocol handler is operable to identify a communications protocol compatible with the host system and to adaptively self-configure communications between the host interface port and the network medium interface port in accordance with the identified compatible communications protocol.

The invention also features a method of self-configuring a communications module.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
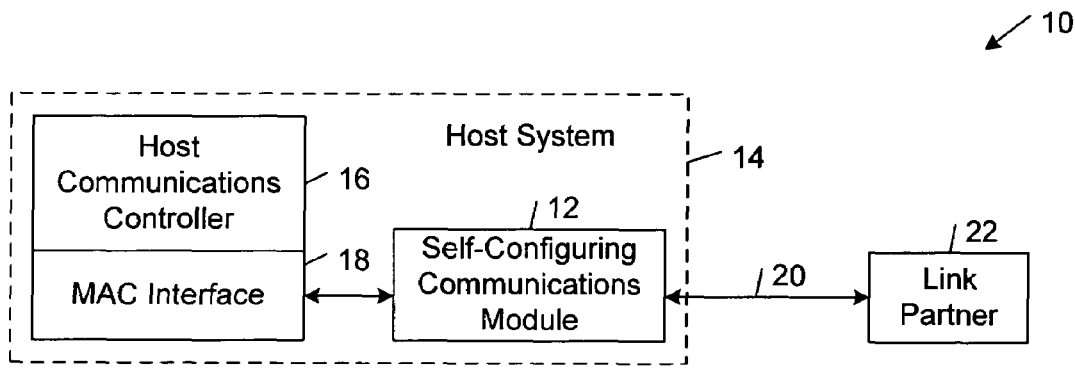
FIG. 1 is a block diagram of a host system that includes a host communications controller, a media access control (MAC) interface, and a self-configuring communications module for coordinating exchange of data signals between the host system and a link partner.

FIG. 1 shows an exemplary application environment 10 in which a self-configuring communications module 12 may operate. The self-configuring communications module 12 is incorporated within a host system 14, which includes a host communications controller 16 and a media access control (MAC) interface 18. The self-configuring communications module 12 functions to transition between the host system 14 and a network medium 20, which connects the host system 14 to one or more link partners 22. The self-configuring communications module 12 may be integrated into host system 14 or integrated into a component (e.g., a NIC) of host system 14. Alternatively, the self-configuring communications module 12 may be a separate, pluggable component of host system 14.

Each of the host system 14 and the link partners 22 may be any type of device or system that connects to a network (e.g., a personal computer, a computer workstation, a network hub, and a network repeater). The host communications controller 16 enables the host system 14 to share access to a network medium 20, which is the physical channel over or through which signals are transmitted in a network. Wire, fiber and air are three exemplary types of network media. The MAC interface 18 connects the host communications controller 16 to the self-configuring communications module 12. One exemplary type of MAC interface is the media independent interface (MII), which provides a parallel interface supporting communications with a parallel host communications controller 16. Another exemplary type of MAC interface is the IEEE 802.03 compliant general purpose serial interface (GPSI), which supports serial communications with a serial host communications controller 16.

Figure 2:
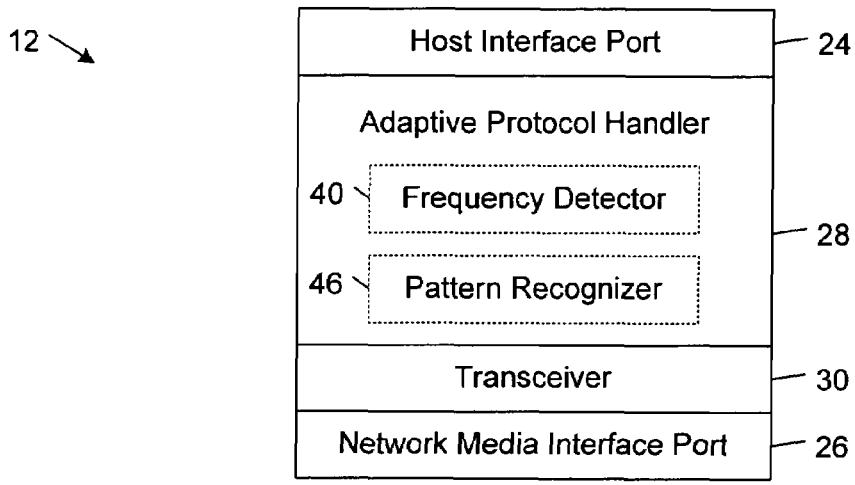
FIG. 2 is a block diagram of the components of the communications module of FIG. 1.

FIG. 2 shows an implementation of the self-configuring communications module 12 that includes a host interface port 24, a network media interface port 26, and an adaptive protocol handler 28. The host interface port 24 is connectable to MAC interface 18. The network medium interface port 26 is connectable to the network medium 20. In the illustrated embodiments, the network interface port 26 provides a physical interface between a transceiver 30 and the network medium 20. For example, if the network medium 20 is an optical fiber communications medium, transceiver 30 may be an optoelectronic transceiver 30 that transitions between optical communications on network medium 20 and electrical communications with the components of host system 14. If the network medium 20 is an electrical communications medium, transceiver 30 may be an electrical transceiver 30 that transitions between electrical communications on network medium 20 and electrical communications with the components of host system 14. Depending on the particular implementation, other components, such as an electromagnetic interference (EMI) shield and a magnetic coupler, may be provided between the network interface port 26 and network medium 20 to achieve efficient signal coupling and electrical isolation.

As explained in detail below, in addition to transitioning between the host system 14 and a network medium 20, communications module 12 adaptively self-configures communications between the host system 14 and the network medium 20 in accordance with an identified communications protocol that is compatible with the host system 14. In this way, a single self-configuring communications module design may be used with many different types of host systems. This feature simplifies manufacturing and marketing tasks for manufacturers of the communications module and reduces component selection complexity, incompatibility issues, and obsolescence risks for customers purchasing the communications module.

Figure 3:
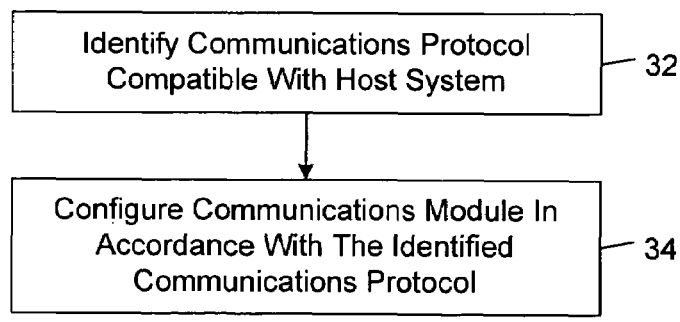
FIG. 3 is a flow diagram of a method by which the communications module of FIG. 1 adaptively self-configures communications between the host system and the network medium in accordance with an identified compatible communications protocol.

Referring to FIG. 3, in one method of adaptively self-configuring communications with the host system, protocol handler 28 identifies a communications protocol that is compatible with the type of host system 14 in which communications module 12 is incorporated (step 32).

Protocol handler 28 may identify the communications protocol compatible with the host system 14 in a variety of different ways. For example, in some implementations, protocol handler 28 identifies the compatible communications protocol based on detection of one or more features of a signal received through the host interface port 24. In other implementations, protocol handler 28 identifies the compatible communications protocol based on detection of a data frame that uniquely identifies a particular communications protocol at one or more specific pins of the host interface port 24. In some implementations, protocol handler 28 cycles through a sequence of tests for different respective communications protocols until a particular communications protocol that is compatible with the host system is identified.

After the compatible communications protocol has been identified (step 32), the protocol handler 28 configures communications module 12 in accordance with the identified communications protocol (step 34). In particular, protocol handler 28 configures communications between the MAC interface 18 and the network medium 20 in accordance with the identified communications protocol. In some implementations, the protocol handler 28 directs communications through a particular one of multiple data paths (or data channels) between the host interface port 24 and network media interface port 26 that converts signals to and from the MAC interface 18 in accordance with the identified communications protocol. In other implementations, protocol handler 28 dynamically converts signals to and from the MAC interface 18 in accordance with the identified communications protocol.

Figure 4:
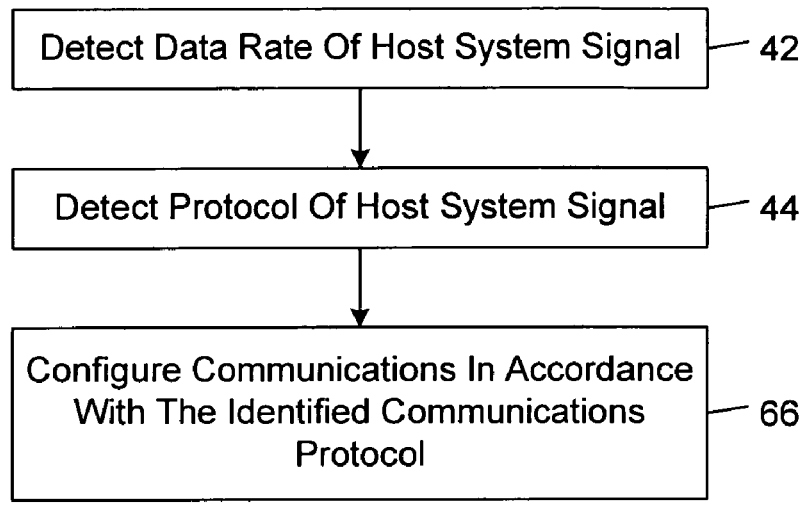
FIG. 4 is a flow diagram of an implementation of the method of FIG. 2.

Referring to FIG. 4, in some embodiments, protocol handler 28 identifies a communications protocol that is compatible with the host system 14 based on at least one host system signal that is received through the host interface port 24. The host system signal may correspond to a predetermined idle signal or an auto-negotiation initialization pattern generated by the host system. In the illustrated implementation, the protocol handler 28 detects the data rate of the host system signal (step 42). In this regard, the protocol handler 28 may include a standard frequency detector 40 (see FIG. 2), such as a frequency-counter-based frequency detector circuit that counts pulses in the host system signal to determine the data rate. Based on the detected host system data rate (step 42), the protocol handler 28 detects the protocol corresponding to the host system signal (step 44). In this regard, the protocol handler 28 may include a pattern recognizer 46 (see FIG. 2) that is set to the detected data rate and is configured to detect one or more predetermined data pulse patterns corresponding to one or more respective communications protocols. The pattern recognizer 46 may be a standard pattern recognizer that is implemented in hardware, firmware or software.

Figure 5:
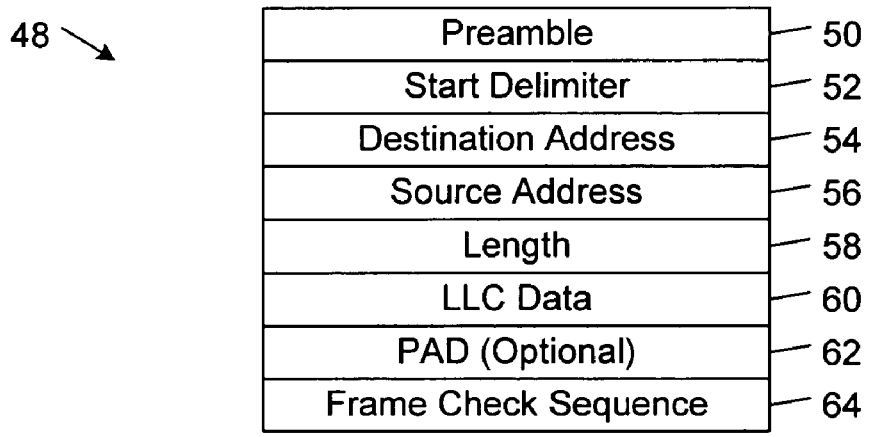
FIG. 5 is a block diagram of an exemplary data frame format for communications in accordance with the Ethernet protocol.

FIG. 5 shows a signal data frame 48 formatted in accordance with the Ethernet communications protocol. The Ethernet data frame 48 begins with a preamble 50 that allows the protocol handler 28 to lock onto the clock of the host communications controller 16. The preamble 50 is followed by a start delimiter 52 that includes a data pattern that differentiates the start of frame 48 from the preamble 50, and is used by the protocol handler 28 to synchronize itself to the start of the frame 48. The preamble 50 consists of fifty-six alternating ones and zeroes and the start delimiter is a binary 10101011 pattern. Thus, in some implementations, after the protocol detector 28 is set to the detected data rate, the protocol detector 28 is configured to detect the Ethernet protocol based on the distinctive binary pattern of one or both of the preamble 50 or the start delimiter 52. The information in the Ethernet frame 48 follows the destination address 54 and the source address 56. In some implementations, the information consists of a two byte length field 58, a data field 60, and padding 62 (if necessary). The data field 60 typically has minimum length of 48 bytes and a maximum length of 1502 bytes. These lengths translate to a minimum frame size of 64 bytes and a maximum frame size of 1518 bytes. A frame check sequence 64 follows the Ethernet information. The end of data frame 58 is marked by the absence of a carrier sense signal (CRS) on the network.

In some implementations, the protocol handler 28 similarly is able to detect the protocol of other host system signals formatted in accordance with protocols different from the Ethernet protocol based on detection of the data rate and recognition of one or more fields of the constituent frames of the host system signals.

After the compatible communications protocol has been identified (step 44), the protocol handler 28 configures communications module 12 in accordance with the identified communications protocol (step 66).

Figure 6:
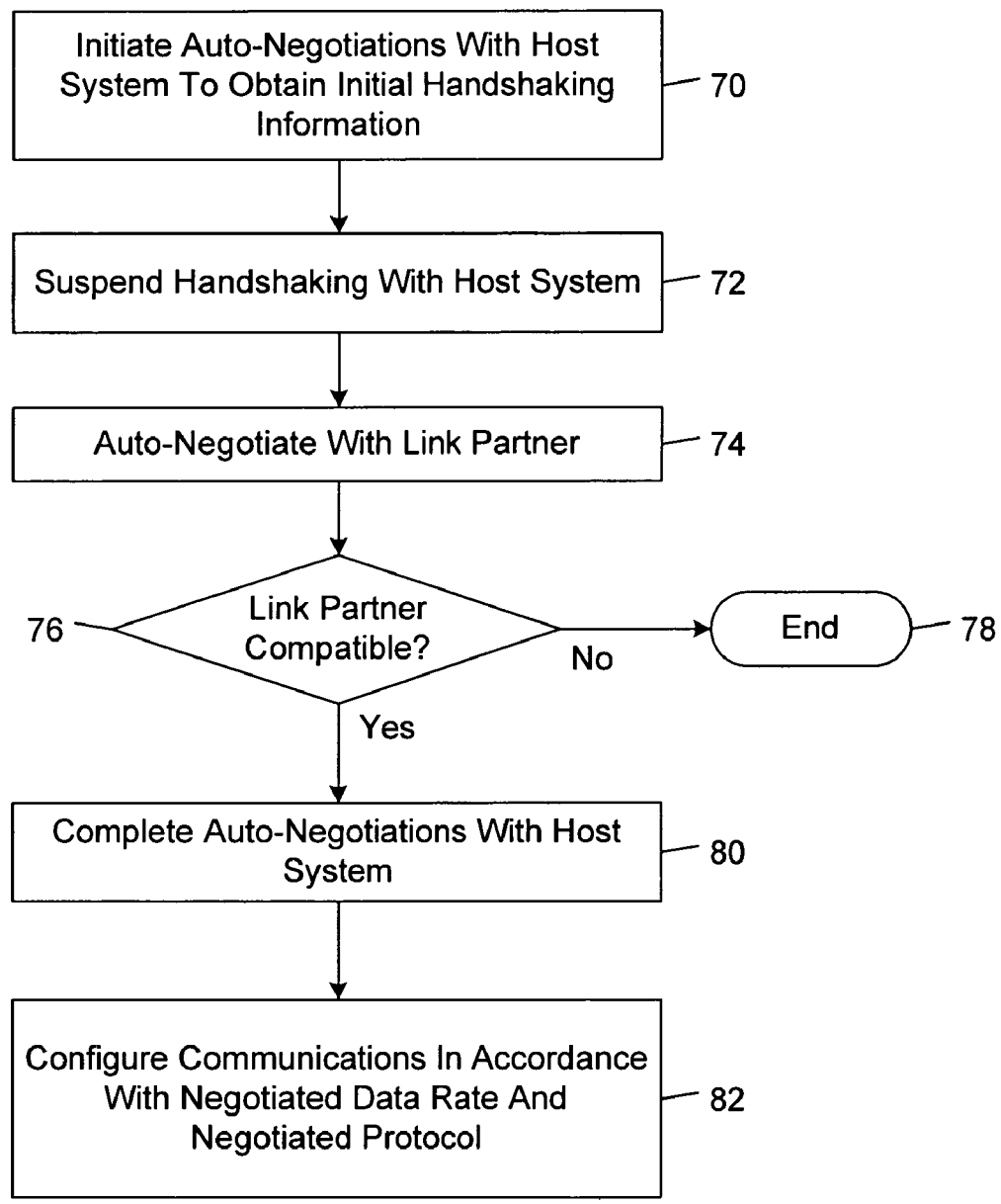
FIG. 6 is a flow diagram of an implementation of the method of FIG. 2.

FIG. 6 shows an embodiment of a method executable by the protocol handler 28 to accommodate implementations of host communications controller 16 that are capable of auto-negotiating with the protocol handler 28 to determine a compatible communications protocol, including a compatible communications data rate. In this embodiment, protocol handler 28 auto-negotiates with the host communications controller 16 to obtain initial handshaking information from the host communications controller 16 (step 70). For example, in some implementations, host communications controller 16 and protocol handler 28 both are configured to auto-negotiate in accordance with the technique defined in the IEEE 802.3u standard to exchange the handshaking information. In one example, when the host communications controller and the protocol handler 28 auto-negotiate in accordance with the 1000 Based-X protocol, the protocol handler 28 obtains from the host communications controller 16 a configuration register base page (or con fig reg base page) that includes bits specifying values for the following fields: FD (full duplex), HD (half-duplex), PS1 (PAUSE), PS2 (ASM_DIR), and RF (remote fault).

After obtaining the handshaking information from the host communications controller 16 (step 70), the protocol handler 28 suspends further handshaking with the host communications controller (step 72). For example, when host communications controller 16 operates in accordance with the 1000 Base-X protocol, protocol handler 28 holds host communications module 16 in the idle_detect state. This may be achieved by transmitting an actual or dummy receiver status signal indicating that a link has been broken or otherwise disrupted, as described in U.S. patent application Ser. No. 10/205,773, filed Jul. 26, 2002, by Andy Engel et al. and entitled "Multiple Protocol Handshaking Between Systems."

Next, protocol handler 28 auto-negotiates with link partner 22 (step 74). Protocol handler 28 may auto-negotiate directly with a MAC controller of the link partner 22 or it may auto-negotiate indirectly with the MAC controller of the link partner 22 through a communications module that is configured to perform handshaking tasks (e.g., a communications module configured like self-configuring communications module 12). In one exemplary implementation, communications module 12 and the communications module of the link partner 22 are configured for multiple protocol handshaking as described in U.S. patent application Ser. No. 10/205,773, filed Jul. 26, 2002, by Andy Engel et al. and entitled "Multiple Protocol Handshaking Between Systems." During auto-negotiation, protocol handler 28 transfers to the link partner 22 the initial handshaking information that was obtained from host communications controller 16. In addition, the protocol handler 28 and the link partner 22 agree on settings for optimal communications. When operating in accordance with the 1000 Based-X protocol, for example, the agreed upon settings specify values for the following fields: FD (full duplex), HD (half-duplex), PS1 (PAUSE), PS2 (ASM_DIR), and RF (remote fault).

If the link partner 22 is not compatible with the host system 14 (step 76), the protocol handler 28 terminates the auto-negotiation process with the host system controller 16 (step 78). If the link partner 22 is compatible with the host system 14 (step 76), the protocol handler 28 completes the auto-negotiation process with the host communications controller 16 in a standard way (step 80). The auto-negotiation process may be resumed by transmitting an actual or dummy receiver status signal indicating that a link has been re-established, as described in U.S. patent application Ser. No. 10/205,773, filed Jul. 26, 2002, by Andy Engel et al. and entitled "Multiple Protocol Handshaking Between Systems." During this process, the protocol handler 28 passes the settings agreed upon by the protocol handler 28 and the link partner 22. In addition, protocol handler 28 configures communications in accordance with the negotiated protocol and the negotiated data rate (step 82). In the end, a link is established between the host system 14 and the link partner 22 in accordance with the common agreed upon settings.

The systems and methods described herein are not limited to any particular hardware or software configuration, but rather they may be implemented in any computing or processing environment, including in digital electronic circuitry or in computer hardware, firmware, or software. In addition, these systems and methods are not limited to any particular communications protocol, standard, communication speed, or communication medium.

Other embodiments are within the scope of the claims.

What is claimed is:

1. A communications module, comprising:
a host interface port connectable to a media access control interface of a host system;
a network medium interface port connectable to a network medium;
a protocol handler operable to identify a communication protocol compatible with the host system and to adaptively self-configure communications between the host interface port and the network medium interface port in accordance with the identified compatible communications protocol; and
a transceiver operable together with the protocol handler to transition communications from the media access control interface sequentially through the host interface port, the protocol handler, the transceiver, and the network medium interface port.

2. The communications module of claim 1, wherein the protocol handler is operable to identify the compatible communications protocol based on at least one signal received through the host interface port.

3. The communications module of claim 1, wherein the protocol handler is operable to detect a data rate of a signal received from the host system through the host interface port and to identify the compatible communications protocol based on the detected data rate.

4. The communications module of claim 3, wherein the protocol handler comprises a frequency detector configured to detect the data rate of the signal received from the host system through the host interface port.

5. The communications module of claim 1, wherein the protocol handler is operable to recognize a pattern in a signal received from the host system through the host interface port and identify the compatible communications protocol based on the recognized pattern.

6. The communications module of claim 5, wherein the protocol handler is operable to recognize the pattern in a data frame of the signal received from the host system through the host interface port.

7. The communications module of claim 5, wherein the pattern is an auto-initialization pattern in the signal received from the host system through the host interface port, and the protocol handler is operable to recognize the auto-negotiation initialization pattern.

8. The communications module of claim 1, wherein the protocol handler is operable to auto-negotiate the compatible communications protocol with the host system.

9. The communications module of claim 8, wherein the protocol handler is operable to obtain from the host system initial handshaking information specifying the compatible communications protocol.

10. The communications module of claim 9, wherein the protocol handler is operable to transfer the initial handshaking information to a link partner connected to the network medium.

11. The communications module of claim 10, wherein the protocol handler is operable to auto-negotiate the compatible communications protocol with the link partner.

12. The communications module of claim 11, wherein the protocol handler is operable to adaptively self-configure the communications between the host interface port and the network medium interface port in accordance with the auto-negotiated communications protocol compatible with both the host system and the link partner.

13. A communications method, comprising:
coupling to a first host system, a self-configuring communications module that is adaptive to a variety of host systems, wherein the coupling comprises coupling a host interface port of the communications module to a media access control interface of the first host system;
operating an adaptive protocol handler of the communications module to identify a first communications protocol used by the first host system; and
further operating the adaptive protocol handler for establishing communications between the host interface port of the communications module and a network medium interface port of the communications module using the identified first communications protocol, thereby providing communications connectivity between the first host system and a network device that is communicatively coupled to the network medium interface port, the communications connectivity being provided from the media access control interface sequentially through the host interface port, the protocol handler, a transceiver of the communications module, and the network medium interface port.

14. The communications method of claim 13, wherein the identifying comprises recognizing a pattern in a signal received from the host system through the host interface port, and identifying the compatible communications protocol based on the recognized pattern.

15. The communications method of claim 14, wherein the pattern is an auto-negotiation initialization pattern in the signal received from the host system through the host interface port, and the identifying comprises recognizing the auto-negotiation initialization pattern and identifying the compatible communications protocol from the recognized auto-negotiation initialization pattern.

16. The communications method of claim 13, further comprising auto-negotiating the compatible communications protocol with the host system.

17. The communications method of claim 16, wherein the auto-negotiating comprises obtaining from the host system initial handshaking information specifying the compatible communications protocol.

18. The communications method of claim 13, further comprising:
inserting the self-configuring communications module into a second host system that is different than the first host system;
operating the adaptive protocol handler of the communications module to identify a second communications protocol used by the second host system, wherein the second communications protocol is different than the first communications protocol; and
operating the adaptive protocol handler for establishing communications between the host interface port of the communications module and the network medium interface port of the communications module using the identified second communications protocol, thereby providing communications connectivity between the second host system and the network device that is communicatively coupled to the network medium interface port.

19. A self-configuring communications module that is adaptive to a variety of host systems, the communications module comprising:
a host interface port configured for coupling the communications module to a host communications controller of a first host system;
a network media interface port configured for coupling the communications module to a proximal end of a network medium, the network medium having a distal end coupled to a network device operable as a link partner to the first host system;
a transceiver coupled to the network media interface port for propagating bi-directional communications through the network media interface port; and
an adaptive protocol handler configured for identifying a variety of communications protocols used by the variety of host systems, the adaptive protocol handler operable to communicate with the host communications controller for identifying a first communications protocol used by the first host system, the adaptive protocol handler further operable to use the identified first communications protocol for establishing a communications link between the first host system and the network device, the communications link comprising a communications path through the host interface port, the protocol handler, the transceiver, and the network medium interface port of the communications module.

20. The communications module of claim 19, wherein the adaptive protocol handler is configured to sequence through a series of different communications protocols for identifying the first communications protocol used by the first host system.

* * * * *